(12) United States Patent
Bhushan et al.

(10) Patent No.: US 8,412,255 B2
(45) Date of Patent: Apr. 2, 2013

(54) REVERSE LINK TRAFFIC POWER CONTROL

(75) Inventors: Naga Bhushan, San Diego, CA (US); Mohammad J. Borran, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1058 days.

(21) Appl. No.: 11/858,472

(22) Filed: Sep. 20, 2007

(65) Prior Publication Data

US 2009/0082052 A1 Mar. 26, 2009

(51) Int. Cl.
*H04B 7/00* (2006.01)

(52) U.S. Cl. .............................. 455/522; 455/68; 455/69

(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | |
|---|---|---|---|
| 8,116,800 B2 | 2/2012 | Gorokhov et al. | |
| 2006/0019694 A1* | 1/2006 | Sutivong et al. | 455/522 |
| 2007/0197254 A1 | 8/2007 | Borran et al. | |
| 2008/0165675 A1* | 7/2008 | Yang et al. | 370/210 |
| 2012/0071193 A1 | 3/2012 | Bhushan et al. | |

FOREIGN PATENT DOCUMENTS

| | | |
|---|---|---|
| CN | 1819484 A | 8/2006 |
| JP | 2008092545 A | 4/2008 |
| JP | 2010512068 | 4/2010 |
| RU | 2120183 C1 | 10/1998 |
| WO | WO9427381 A1 | 11/1994 |
| WO | WO2006099546 | 9/2006 |
| WO | WO2007050926 | 5/2007 |
| WO | WO2008067471 | 6/2008 |

OTHER PUBLICATIONS

Alcatel-Lucent: "On the UL power control rule for the UE" 3GPP Draft; R1-073062_PC, 3RD Generation Partnership Project (3GPP), Mobile Competence Centre; 650, Route Des Lucioles; F-06921 Sophia-Antipolis Cedex; France, vol. tsg_ran\WG1_RL1\TSGR1_49b\Docs, No. Orlando, USA; 20070625, Jun. 19, 2007, XP050106718.

IEEE 802 LAN/MAN Standards Committee: "IEEE P802.20 Draft Standard for Local and Metropolitan Area Networks—Standard Air Interface for Mobile Broadband Wireless Access Systems Supporting Vehicular Mobility—Physical and Media Access Control Layer Specification" Mar. 2007, pp. 221-540, XP002519973, New York, p. 221-223; p. 327-331; p. 379-384; p. 504; p. 539-540; p. 317.

International search report and Written Opinion—PCT/US2008/077066, International Search Authority—European Patent Office—Oct. 2, 2009.

(Continued)

*Primary Examiner* — Dominic E Rego
(74) *Attorney, Agent, or Firm* — Howard Seo

(57) ABSTRACT

Systems and methodologies are described that facilitate reverse link power control on a traffic channel. Indications of other sector interference or other such interference levels can be broadcasted in a wireless communication. Further, power control related information can be included in assignments to mobile devices. Mobile device can utilize the information in the assignment to set a range for delta-based power control. Further, devices employ broadcasted interference indications to maintain and adjust delta values that enable power settings to be established on traffic channels. Moreover, mobile devices may provide feedback to facilitate future assignments.

28 Claims, 11 Drawing Sheets

OTHER PUBLICATIONS

Qualcomm Europe: "Considerations on Power Control for OFDMA based E-UTRA" 3GPP Draft; R1-050898, 3RD Generation Partnership Project (3GPP), Mobile Competence Centre; 650, Route Des Lucioles; F-06921 Sophia-Antipolis Cedex; France, vol. RAN WG1, No. London, UK; Aug. 25, 2005, XP050100518.

European Search Report—EP08153841—Munich—Sep. 24, 2009.
Partial European Search Report—EP08153841—Search Authority—Munich—Mar. 26, 2009.
Taiwan Search Report—TW097136426—TIPO—Jan. 21, 2012.
Borran J., et al., "RL Traffic Power Control for LBC FDD", C30-20061030-076, 3GPP2, Oct. 2006, p. 1-15.

* cited by examiner

REVERSE LINK TRAFFIC POWER CONTROL

BACKGROUND

I. Field

The following description relates generally to wireless communications, and more particularly to delta-based reverse link traffic power control.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each access point supports terminals located within a specific coverage area referred to as a sector. A sector that supports a specific terminal is referred to as the serving sector. Other sectors, not supporting the specific terminal, are referred to as non-serving sectors. Terminals within a sector can be allocated specific resources to allow simultaneous support of multiple terminals. However, transmissions by terminals in neighboring sectors are not coordinated. Consequently, transmissions by terminals at sector edges can cause interference and degradation of terminal performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that facilitates reverse link traffic channel power control is described herein. The method can comprise providing power control information in an assignment. In addition, the method can include broadcasting an interference offset value for each subband utilized to establish an adjustment range. The method can further comprise broadcasting an other sector interference (OSI) indication that is employed to adjust a power control value.

Another aspect relates to a wireless communications apparatus that can comprise a memory that retains instructions related to broadcasting interference offset values for each subband, broadcasting regular Other Sector Interference (OSI) parameters and broadcasting fast OSI parameters. The wireless communications apparatus can also include a processor coupled to the memory and configured to execute the instructions retained in the memory.

Yet another aspect relates to a wireless communications apparatus that facilitates delta-based power control. The apparatus can include means for providing power control information in an assignment of a mobile device. In addition, the apparatus can include means for broadcasting an interference offset value for each subband. The apparatus can further comprise means for broadcasting an OSI indication that enables delta-based power control.

Still another aspect relates to a machine-readable medium having stored thereon machine-executable instructions for providing power control information in an assignment. The machine readable medium can further comprise instructions for broadcasting an interference offset value for each subband utilized to establish an adjustment range. In addition, the machine-readable medium can include instructions for broadcasting an OSI indication that is employed to adjust a power control value.

According to another aspect, in a wireless communication system, an apparatus can comprise an integrated circuit. The integrated circuit can be configured to assign a reverse link traffic channel to a mobile device. The integrate circuit can further be configured to provide power control related information in the assignment and broadcast regular and fast OSI indications to at least one mobile device to facilitate delta-based power control.

According to yet another aspect, a method that effectuates delta-based power control is described herein. The method can comprise establishing an allowable range for a delta value based in part upon power control related information included in an assignment. In addition, the method can include evaluating an adjustment to the delta value based in part on broadcasted other sector interference (OSI) indications. The method can further comprise setting a power spectral density corresponding to a reverse link traffic channel in accordance with the delta value.

Another aspect described herein relates to a wireless communications apparatus that can include a memory that retains instructions related to establishing an allowable range for a delta value based in part upon power control related information included in an assignment, evaluating an adjustment to the delta value based in part on broadcasted OSI indications and setting a power spectral density corresponding to a reverse link traffic channel in accordance with the delta value. In addition, the wireless communications apparatus can comprise an integrated circuit coupled to the memory, configured to execute the instructions retained in the memory.

Yet another aspect relates to a wireless communications apparatus that effectuates delta-based power control. The apparatus can comprise means for establishing an allowable range for a delta value based in part upon power control related information included in an assignment. In addition, the apparatus can include means for evaluating an adjustment to the delta value based in part on broadcasted OSI indications. Further, the apparatus can comprise means for setting a power spectral density corresponding to a reverse link traffic channel in accordance with the delta value.

Still another aspect relates to a machine-readable medium having stored thereon machine-executable instructions for establishing an allowable range for a delta value based in part upon power control related information included in an assignment. The machine-readable medium can further include instructions for evaluating an adjustment to the delta value based in part on broadcasted other sector interference (OSI) indications. In addition, the machine-readable medium can comprise instructions for setting a power spectral density corresponding to a reverse link traffic channel in accordance with the delta value.

A further aspect described herein relates to an integrated circuit configured to establish an allowable range for a delta value based in part upon power control related information included in an assignment. In addition, the integrate circuit can be configured to determine an adjustment to the delta value based in part on broadcasted other sector interference (OSI) indications. Further, the integrated circuit can be configured to set a power spectral density corresponding to a reverse link traffic channel in accordance with the delta value.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 2 is an illustration of an example wireless communications system that effectuates reverse link traffic power control according to an aspect of the subject disclosure.

DETAILED DESCRIPTION

Figure 1:
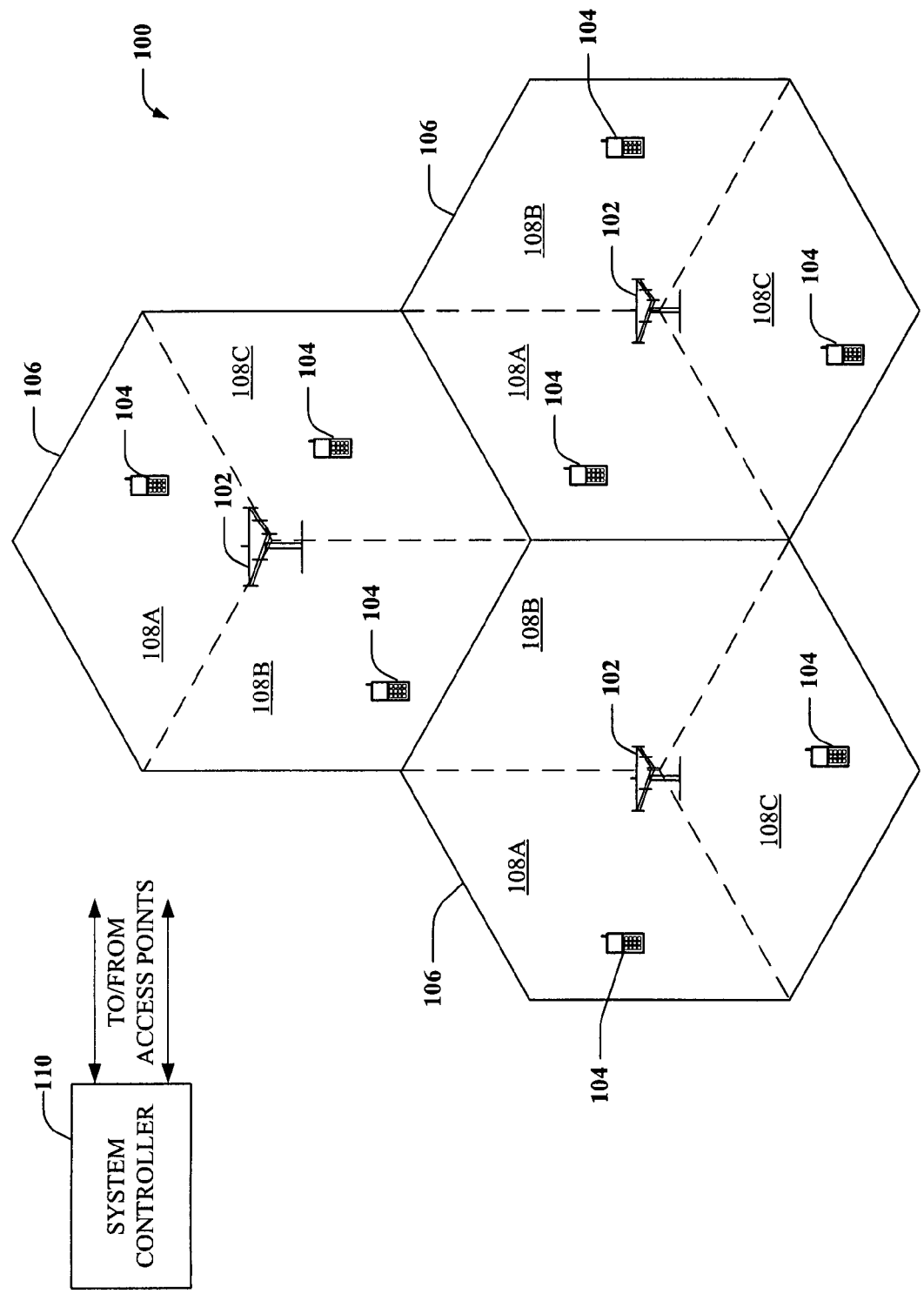
FIG. 1 is an illustration of a wireless communication system in accordance with one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.).

Referring now to FIG. 1, a wireless communication system 100 in accordance with various aspects presented herein is illustrated. System 100 can comprise one or more access points 102 that receive, transmit, repeat, etc., wireless communication signals to each other and/or to one or more terminals 104. Each base station 102 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Terminals 104 can be, for example, cellular phones, smart phones, laptops, handheld communication devices, handheld computing devices, satellite radios, global positioning systems, PDAs, and/or any other suitable device for communicating over wireless system 100. In addition, each terminal 104 can comprise one or more transmitter chains and receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 1, each access point provides communication coverage for a particular geographic area 106. The term "cell" can refer to an access point and/or its coverage area, depending on context. To improve system capacity, an access point coverage area can be partitioned into multiple smaller areas (e.g., three smaller areas 108A, 108B and 108C). Each smaller area is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell.

Terminals 104 are typically dispersed throughout system 100. Each terminal 104 may be fixed or mobile. Each terminal 104 may communicate with one or more access points 102 on the forward and reverse links at any given moment.

For a centralized architecture, a system controller 110 couples access points 102 and provides coordination and control of access points 102. For a distributed architecture, access points 102 may communicate with one another as needed. Communication between access points via system controller 110 or the like can be referred to as backhaul signaling.

The techniques described herein may be used for a system 100 with sectorized cells as well as a system with un-sectorized cells. For clarity, the following description is for a system with sectorized cells. The term "access point" is used generically for a fixed station that serves a sector as well as a fixed station that serves a cell. The terms "terminal" and "user" are used interchangeably, and the terms "sector" and "access point" are also used interchangeably. A serving access point/sector is an access point/sector with which a terminal has reverse link traffic transmissions. A neighbor access point/sector is an access point/sector with which a terminal does not have reverse link traffic transmissions. For example, an access point only serving the forward link to a terminal should be considered a neighbor sector for interference management purposes.

Figure 2:
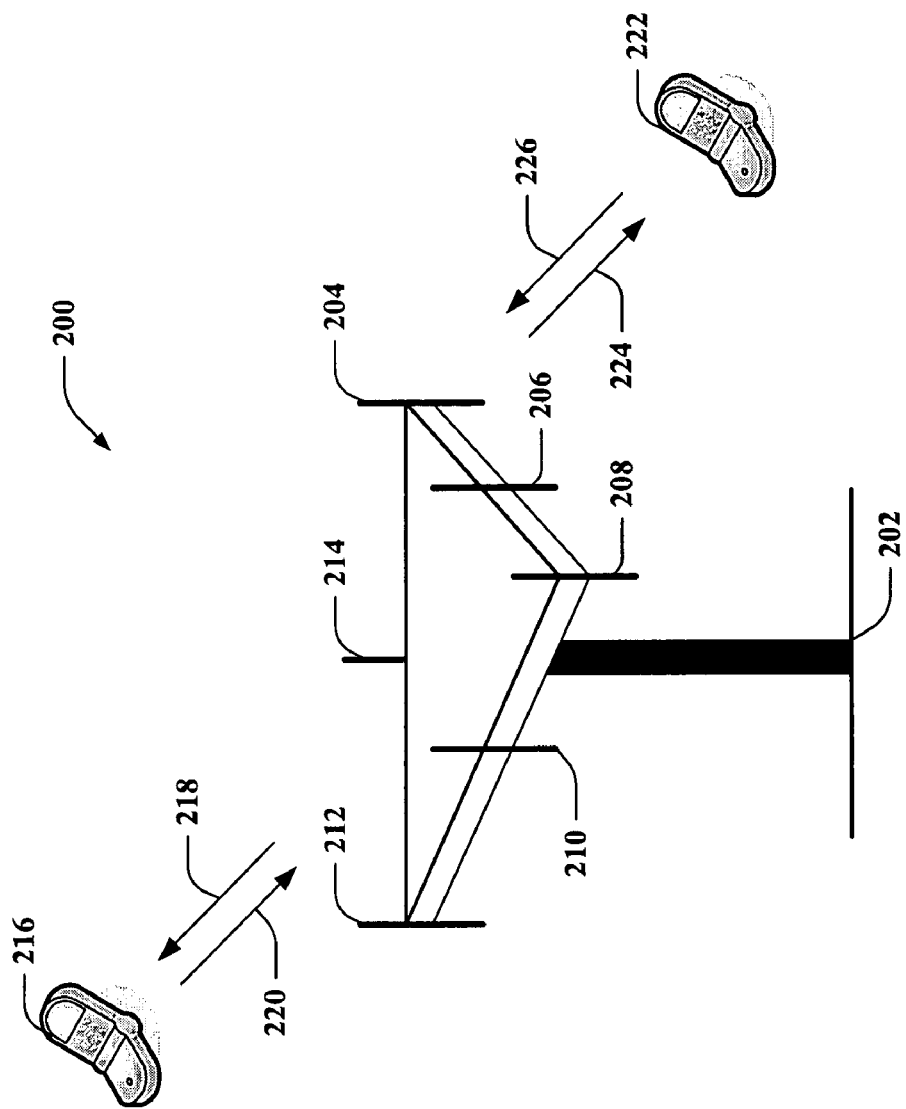
FIG. 2 is an illustration of a wireless communication system in accordance with various aspects set forth herein.

Referring now to FIG. 2, a wireless communication system 200 is illustrated in accordance with various embodiments presented herein. System 200 comprises a base station 202 that may include multiple antenna groups. For example, one antenna group may include antennas 204 and 206, another group may comprise antennas 208 and 210, and an additional group may include antennas 212 and 214. Two antennas are illustrated for each antenna group; however, more or fewer antennas may be utilized for each group. Base station 202 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 202 may communicate with one or more mobile devices such as mobile device 216 and mobile device 222; however, it is to be appreciated that base station 202 may communicate with substantially any number of mobile devices similar to mobile devices 216 and 222. Mobile devices 216 and 222 can be, for example, cellular phones, smart phones, laptops, handheld communication devices, handheld computing devices, satellite radios, global positioning systems, PDAs, and/or any other suitable device for communicating over wireless communication system 200. As depicted, mobile device 216 is in communication with antennas 212 and 214, where antennas 212 and 214 transmit information to mobile device 216 over a forward link 218 and receive information from mobile device 216 over a reverse link 220. Moreover, mobile device 222 is in communication with antennas 204 and 206, where antennas 204 and 206 transmit information to mobile device 222 over a forward link 224 and receive information from mobile device 222 over a reverse link 226. In a frequency division duplex (FDD) system, forward link 218 may utilize a different frequency band than that used by reverse link 220, and forward link 224 may employ a different frequency band than that employed by reverse link 226, for example. Further, in a time division duplex (TDD) system, forward link 218 and reverse link 220 may utilize a common frequency band and forward link 224 and reverse link 226 may utilize a common frequency band.

The set of antennas and/or the area in which they are designated to communicate may be referred to as a sector of base station 202. For example, multiple antennas may be designed to communicate to mobile devices in a sector of the areas covered by base station 202. In communication over forward links 218 and 224, the transmitting antennas of base station 202 may utilize beamforming to improve signal-to-noise ratio of forward links 218 and 224 for mobile devices 216 and 222. Also, while base station 202 utilizes beamforming to transmit to mobile devices 216 and 222 scattered randomly through an associated coverage, mobile devices in neighboring cells may be subject to less interference as compared to a base station transmitting through a single antenna to all its mobile devices.

According to an example, system 200 may be a multiple-input multiple-output (MIMO) communication system. Further, system 200 may utilize any type of duplexing technique to divide communication channels (e.g., forward link, reverse link, . . . ) such as FDD, TDD, and the like. Moreover, system 200 may employ information broadcasts to effectuate dynamic power control for the reverse links. Pursuant to an illustration, base station 202 may transmit power control related information over forward links 218 and 224 to mobile devices 216 and 222. The power control related information can be included in a reverse link data channel assignment provided to the mobile devices 216 and 222. Base station 202 may broadcast other sector interference indications. For example, base station 202 may broadcast regular other sector interference values every superframe and fast other sector interference values for every subband on every reverse link frame. The other sector interference is broadcasted to mobile devices (not shown) in other sectors not served by base station 202. Additionally, mobile devices 216 and 222 receive the broadcasted other sector interference values from base stations other than base station 202. Mobile devices 216 and 222 may also receive the power control related information included in the assignment from base station 202. Accordingly, mobile device 216 and 222 can employ the received other sector interference values and power control information to adjust power on a reverse link data channels. For example, mobile devices 216 and 222 may utilize fast other sector interference values to maintain and adjust transmit delta values employed to regulate power spectral density of the reverse link data channels. In addition, mobile devices 216 and 222 may employ regular other sector interference values to maintain and adjust slow delta values that may be communication to base station 202 via reverse links 220 and 226, respectively. The slow delta values may be employed by base station 202 as suggested values for future assignments.

Figure 3:
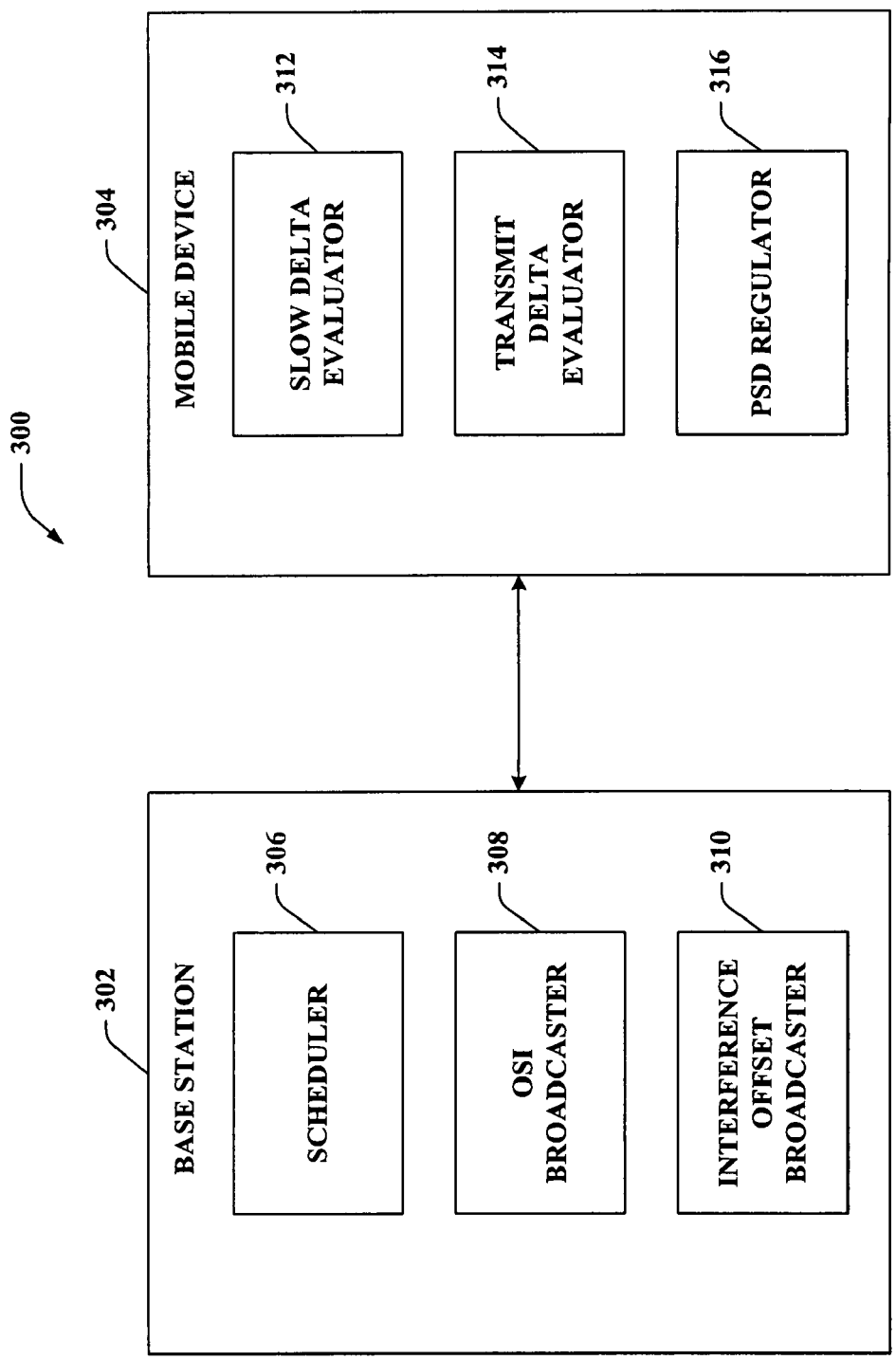

Turning now to FIG. 3, illustrated is a wireless communications system 300 that effectuates reverse link transmit power control based upon considerations of broadcasted interference values, among other things. System 300 includes a base station 302 that communicates with a mobile device 304 (and/or any number of disparate mobile devices (not shown)). Base station 302 may transmit power control related information to mobile device 304 over a forward link channel and broadcast other sector interference values to mobile devices located in other sectors not served by base station 302. Further base station 302 may receive information from mobile device 304 over a reverse link channel. Moreover, system 300 may be a MIMO system.

Base station 302 may include a scheduler 306, an other sector interference (OSI) broadcaster 308 and an interference offset broadcaster 310. Scheduler 306, among other things, provides a channel assignment to mobile device 304. The assignment may include a channel ID that specifies a set of hop ports via a channel tree. The assignment may also specify a packet format. The packet format can be the coding and/or modulation to be employed for transmissions on the assigned resources. Moreover, the assignment may include parameters that indicate the assignment is an extended transmission duration assignment and/or whether the assignment should replace or supplement an existing assignment. In accordance with an aspect of the subject disclosure, each packet format has an associated minimum carrier-to-interference (C/I) value for a data channel (hereinafter referred to as DataCtoI$_{min}$). The DataCtoI$_{min}$ value corresponds to the minimum C/I required to achieve a certain error rate at a particular hybrid automatic repeat request (HARQ) attempt. In addition, scheduler 306 conveys a minimum and maximum carrier over thermal values for a data channel (hereinafter referred to as DataCoT$_{min}$ and DataCoT$_{max}$). These values may be included in the assignment issued by scheduler 306 of base station 302 to mobile device 304. Further, the assignment from scheduler 306 may include a C/I value for a data channel that is assigned to mobile device 304, DataCtoI$_{assigned}$. This value is selected based on a target HARQ termination. According to one aspect of the subject disclosure, a reserved value of DataCtoI$_{assigned}$ can be employed to instruct mobile devices to utilize its current delta value on the assignment interlace. Furthermore, scheduler 306 determines a maximum delta increase value (MaxDeltaIncrease) and a maximum delta reduction value (MaxDeltaReduction) per quality of service (QoS) class. While these aforementioned parameters (e.g. DataCtoI$_{min}$, DataCoT$_{min}$, DataCoT$_{max}$, DataCtoI$_{assigned}$, step sizes, etc.) are assigned by base station 304, it is to be appreciated that the parameters need not be assigned through the same mechanisms or at the same time. For example, DataCoT$_{min}$, DataCoT$_{max}$, and step size may be semi-static parameters that need not be assigned for each packet or assignment. These parameters may be updated through upper layer messages or the like whenever an update is needed.

These values may be utilized by mobile device 304 in power control decisions. For example, the parameters may be employed to establish a range of transmit delta adjustments. The range may be specified in a plurality of ways. According to one aspect, explicit DataCtoI$_{min}$ and DataCtoI$_{max}$ values can be assigned and utilized to establish the range. In addition, relative bounds can be employed, for example, through parameters specifying maximum reduction or increase in the delta or C/I values. By way of illustration, a MaxDeltaIncrease and a MaxDeltaReduction parameter can be utilized. According to another illustration, a MaxCtoIIncrease value and a MaxCtoIReduction value may be employed. It is to be appreciated that combinations may also be possible (e.g., MaxDeltaIncrease and MaxCtoIReduction).

Scheduler 306 assigns resources (channels, frequencies, bandwidth, etc.) to mobile device 304. Base station 302, employing scheduler 306, makes assignment decisions based upon various considerations. For example, the assignment decision may factor information received over the reverse request channel (R-REQCH). The request may include a buffer size or a quality of service (QoS) level. In addition, the scheduler 306 may base the assignment decision on other feedback information received from mobile device 304. Scheduler 306 may account for received feedback information such as a slow delta value that serves as a suggested value for future assignments. The feedback information may further include power amplifier headroom, an indication of fast OSI activity and the like.

Base station 302 further includes OSI broadcaster 308 that broadcasts other sector interference information to mobile devices in the other sectors not served by base station 302. At every superframe, base station 302 employs OSI broadcaster 308 to broadcast a regular OSI value to mobile devices. The regular OSI value represents an average interference observed during the previous superframe. It is to be appreciated that more than one previous superframe may be averaged. By way of example and not limitation, the regular OSI value may comprise the average interference observed during the previous three superframes. In accordance with an aspect, the regular OSI value may be broadcasted on a broadcast channel such as the forward link OSI pilot channel (F-OSICH). In addition, the regular OSI indication may be transmitted on the superframe preamble of every superframe. Delta-based power control by mobile device 304 based upon the regular OSI indications from base stations in other sectors can result in tight interference distributions in full-buffer scenarios.

In bursty traffic situations, more dynamic control of power levels may be required. Accordingly, OSI broadcaster 308 also broadcasts a fast OSI value received by mobile device 304 and other mobile devices served by base station 302. The fast OSI indication may be broadcasted over a fast OSI channel (F-FOSICH) on the forward link control segment. By way of example and not limitation, the fast OSI reports may be grouped in collections of four bits each and each collection may be transmitted utilizing six modulation symbols similar to data transmission over the forward pilot quality indicator channel (F-PQICH). In this example, erasure may be mapped to the all zero sequence such that there is no fast OSI indication on any of the involved subbands. The fast OSI value can be broadcasted for every subband on each interlace of every reverse link frame. The fast OSI value may be based upon interference observed over a particular subband on a certain reverse link frame.

Base station 302 further includes interference offset broadcaster 310. To reduce packet errors in the event of large interference over thermal (IoT) rise due to bursty traffic in the neighboring sectors, base station 302, via interference offset broadcaster 310, may employ fast IoT reports. Base station 302 may further employ scheduler 306 to facilitate dynamic adjustments of the minimum allowed delta value for each assignment as described infra. Interference offset broadcaster transmits an interference offset value, InterferenceOffset$_s$ for every subband, s. This value is based at least in part upon an amount of interference observed by base station 302 on subband filtered across interlaces. This value can be transmitted over the forward interference over thermal channel (F-IOTCH).

In addition to the above described reports, base station 302 may further transmit quantized information about received control pilot carrier-over-thermal (CoT) power spectral density (PSD) for mobile device 304, if active, and for all active mobile devices in the sector served by base station 302. This information may be transmitted over F-PQICH. This information and the above described values can be employed by mobile device 304 in performing delta-based power control. According to an aspect of the subject disclosure, mobile device 304 maintains and adjusts a slow delta value and a transmit delta value.

A delta value is an offset between a PSD of a control pilot and a traffic PSD. The delta value is related to a received C/I value (e.g., DataCtoI) through a control pilot carrier-over-thermal PSD (pCoT) and a traffic interference-over-thermal PSD (IoT). For example, a delta value may be mapped to a data C/I value according to the following:

$$\Delta = CoT_{data} - CoT_{control}$$

$$\Delta = CoI_{data} + IoT_{data} - CoT_{control}$$

Pursuant to this illustration, $CoT_{data}$ is a carrier-over-thermal value of a data or traffic channel. The value, $CoT_{control}$, is a carrier-over-thermal value for a control channel such as the pilot channel PSD value (pCoT) received from a base station. Accordingly, the delta value, $\Delta$, is the difference or offset between the control and the traffic PSD values. $CoT_{data}$ is equivalent to the sum of the C/I value for the data channel, $CoI_{data}$, and the interference-over-thermal value for the data channel, $IoT_{data}$. $CoI_{data}$ can be the DataCtoI value assigned to a mobile device by a base station as described supra. In addition, $IoT_{data}$ can be the interference offset value transmitted by the base station.

Mobile device 304 maintains and adjusts delta values in accordance with a delta value range. The delta value range is established by mobile device 304 based upon broadcasted information received or information included in the assignment from base station 302. For example, mobile device 304 sets a minimum slow delta value, $\Delta_{slow,min}$, and a maximum slow delta value, $\Delta_{slow,max}$, based upon the following:

$$\Delta_{slow,min} = DataCoT_{min} - pCoT_{RLSS}$$

$$\Delta_{slow,max} = DataCoT_{max} - pCoT_{RLSS}$$

The values $DataCoT_{min}$ and $DataCoT_{max}$ are minimum and maximum, respectively, carrier-over-thermal PSD values for a traffic channel provided by base station 302 as part of the assignment. The value $pCoT_{RLSS}$ is the carrier-over-thermal PSD value for a pilot channel of the reverse link serving sector. Thus, mobile device 304 sets a slow delta value range based upon indications broadcasted or assigned by base station 302.

Mobile device 304 includes a slow delta evaluator 312 that maintains and adjusts a slow delta value, $\Delta_{slow}$. Slow delta evaluator 312 determines and adjusts the slow delta value based upon the regular OSI indications broadcasted by an other sector base station similar to base station 302. At every superframe, slow delta evaluator 312 generates an OSI monitor set. The OSI monitor set is formed by applying a threshold value to forward link geometries of sectors mobile device 304 can acquire. Additionally, the OSI monitor set may be formed by applying a threshold value to chandiff values of other sectors. It is to be appreciated that a separate monitor set can be generated for other sector base stations broadcasting fast OSI indications. The fast OSI monitor set may be restricted to members of the active set of mobile device 304. The sector comprising the reverse link serving sector of mobile device 304 is not include in the OSI monitor set. The OSI monitor set includes sectors that may be affected by interference caused by mobile device 304. For each member of the OSI monitor set, slow delta evaluator 312 computes chandiff values. The chandiff values are based upon received power on an acquisition pilot while taking into account the transmit power of each sector in the monitor set. Slow delta evaluator 312 adjusts the slow delta value based in part on the regular OSI values broadcasted from members of the OSI monitor set. Slow delta evaluator 312 further considers the corresponding chandiff values computed as well as the current slow delta value of mobile device 304. The slow delta value is adjusted with the constraint that the value does not fall below the minimum value nor exceeds the maximum value. Mobile device 304 communicates the adjusted slow delta value to base station 302, the reverse link serving base station. The communicated value is employed as a suggested value for future assignments by base station 302.

Mobile device 304 further includes transmit delta evaluator 314 that maintains and adjusts a transmit delta value, $\Delta_{tx}$. Transmit delta evaluator 314 determines and alters the transmit delta value based upon the fast OSI indications broadcast by an other sector base station similar to base station 302. The adjustment can be per subband when the fast OSI indications are also per dsubband. After assignment on subband, s, with an explicit $DataCtoI_{assigned}$ provided by scheduler 306 of base station 302, transmit delta evaluator 314 establishes a range for the transmit delta value. For each packet (or sub-packet), p, to be transmitted on subband s, transmit delta evaluator 314 establishes a minimum delta value, $\Delta_{min,p}$, and an assigned or maximum delta value, $\Delta_{max,p}$, according to the following:

$$\Delta_{min,p} = InterferenceOffset_{RLSS,s} - pCOT_{RLSS} + DataCtoI_{min,p}$$

$$\Delta_{max,p} = InterferenceOffset_{RLSS,s} - pCOT_{RLSS} + DataCtoI_{assigned,p}$$

Pursuant to this illustration, the value, $InterferenceOffset_{RLSS,s}$, is an indication of the interference over thermal level for subband s in the reverse link serving sector. This value is broadcasted by base station 302 and received by mobile device 304. The value, $pCoT_{RLSS}$, is the pilot CoT PSD in the reverse link serving sector for mobile device 304. The value, $DataCtoI_{min,p}$, is the minimum C/I value corresponding to packet, p. Mobile device 304 receives the value, $DataCtoI_{assigned,p}$, in the assignment from scheduler 306 in base station 302. Transmit delta evaluator 314 utilizes the most recent (i.e., un-erased) values of InterferenceOffset and pCoT. Further, a default sector-specific interference over thermal value may be utilized by transmit delta evaluator 314 if the channel conveying the interference offset is erased for a number of report intervals.

After establishing the range for transmit delta value, $\Delta_{tx}$, transmit delta evaluator 314 adjusts the value based upon the fast OSI indications broadcasted by neighboring sectors and received by mobile device 304. Initially, the transmit delta value is initialized to $\Delta_{max}$, as evaluated supra. After initialization, the transmit delta value is adjusted by stepping the value up or down based upon consideration of the broadcasted fast OSI indications. For a retransmission on interlace, i, transmit delta evaluator 314 adjust the transmit delta value in response to fast OSI indications corresponding to the previous transmission on that interlace. The adjustment may be effectuated according to the following:

$$\Delta_{tx} = \begin{cases} \Delta_{tx} + fastOSIStepUp & \text{if all } fastOSI_i = 0 \\ \Delta_{tx} - fastOSIStepDown & \text{if any } fastOSI_i = 1 \end{cases}$$

Pursuant to this example, the value, $fastOSI_i$, is the fast OSI indications received corresponding to interlace i. The values, fastOSIStepUp and fastOSIStepDown, are a transmit delta value step up size and step down size respectively. The adjustment is made by transmit delta evaluator 314 with the constraint that the transmit delta value does not exceed $\Delta_{max}$ and does not fall below $\Delta_{min}$. For new packets or for new assignments not including any explicit $DataCtoI_{assigned}$ value, the transmit delta value is not initialized to $\Delta_{max}$. Rather, transmit delta evaluator 314 utilizes the most recent transmit delta value and performs the same adjustments as described above.

According to another aspect of the subject disclosure, mobile device 304 includes PSD regulator 316 that sets the transmit PSD of an assigned reverse link data channel (e.g., R-DCH) for every assignment. It is to be appreciated that the transmit PSD may be set every subband when the transmit delta value and fast OSI indications are per subband. The transmit PSD for the data channel is established in accordance with the following:

$$PSD_{R\text{-}DCH} = PSD_{R\text{-}PICH} + \Delta_{tx} + AttemptBoost_j$$

Pursuant to an illustration, j is the sub packet index, and the boost values, $AttemptBoost_j$, are assigned by base station 302. The value, $PSD_{R\text{-}PICH}$, is the PSD of the reverse link pilot channel. If the resultant transmit power is larger than the maximum transmit power available for traffic, PSD regulator 316 scales the data PSD such that the total transmit power is the maximum transmit power.

Further, in accordance with another aspect of the subject disclosure, mobile device 304 provides feedback to base station 302. Mobile device 304 may communicated out-of-band reports and in-band reports. Out-of-band reports may include information related to carrier-over-thermal values or chandiff values. For example, mobile device 304 may communicate a maximum achievable received CoT value over the entire band. The CoT value may be an indication of PA headroom. This value may be calculated utilizing the pilot CoT feedback received on the pilot quality indicator channel of the forward link. According to an example, this value is only transmitted after substantial change from the previous report. In addition, mobile device 304 may report a chandiff value to base station 302. Similar to the reported CoT value, this value may only be reported after a substantial change.

In addition to an in-band request, mobile device 304 may report power control related information. For example, mobile device 304 may report a power amplifier headroom value, a slow delta value or a transmit delta value corresponding to the most recent adjusted value. Similar to the out-of-band reports, these reports may be transmitted after a significant change with respect to the previous report.

Figure 4:
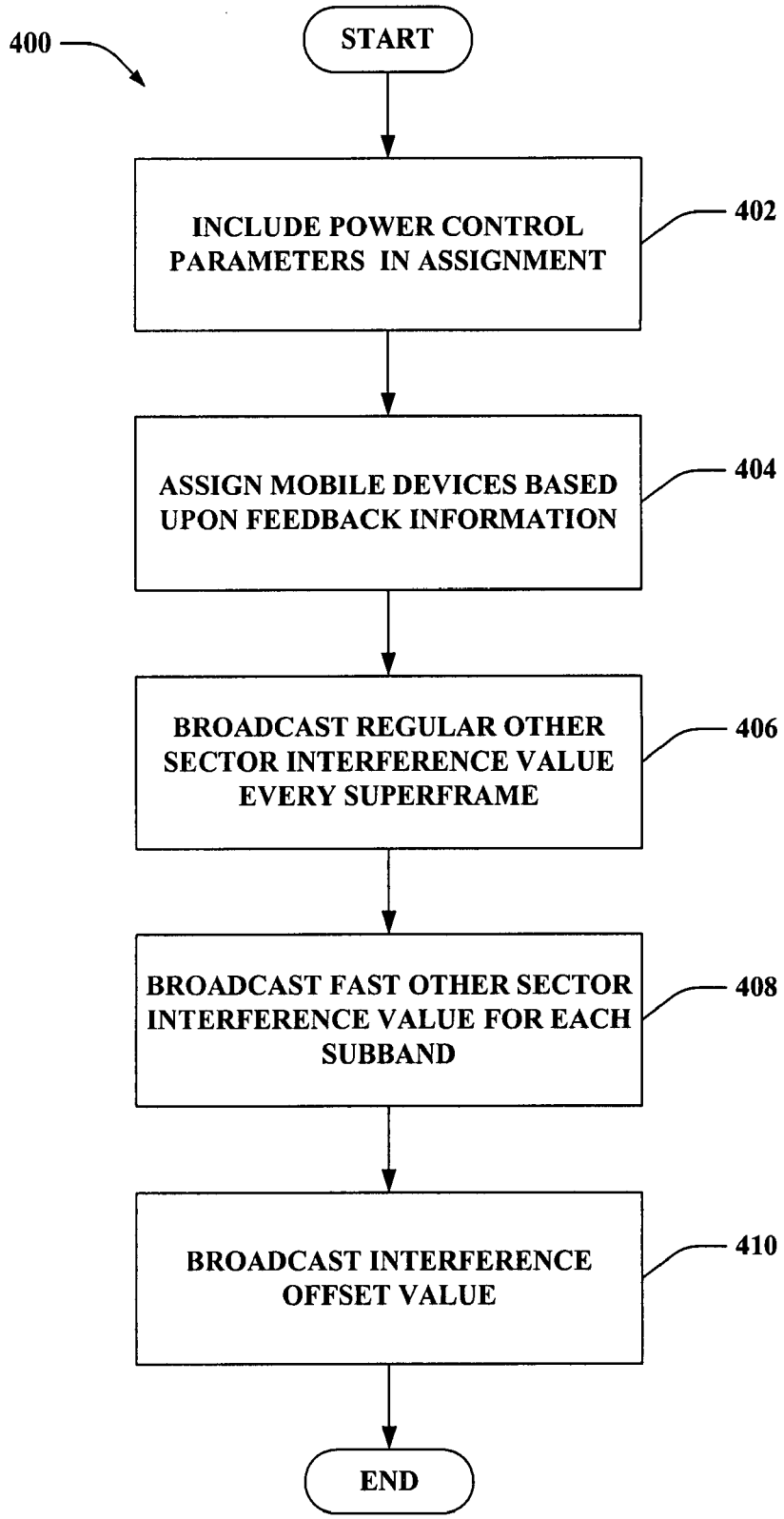
FIG. 4 is an illustration of an example methodology that facilitates reverse link power control in accordance with an aspect of the subject disclosure.
Figure 5:
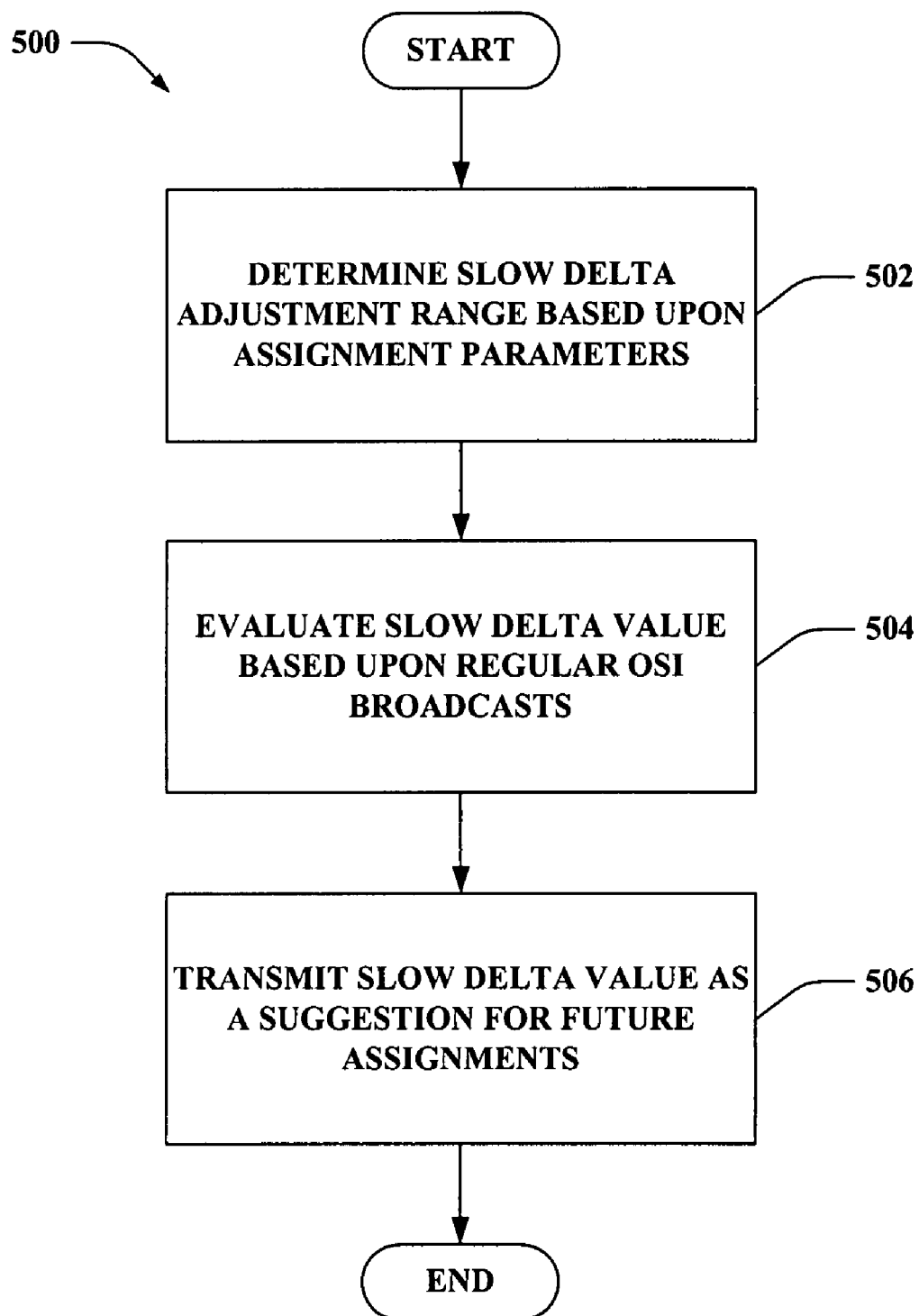
FIG. 5 is an illustration of an example methodology that evaluates slow delta values based upon broadcasted interference information.
Figure 6:
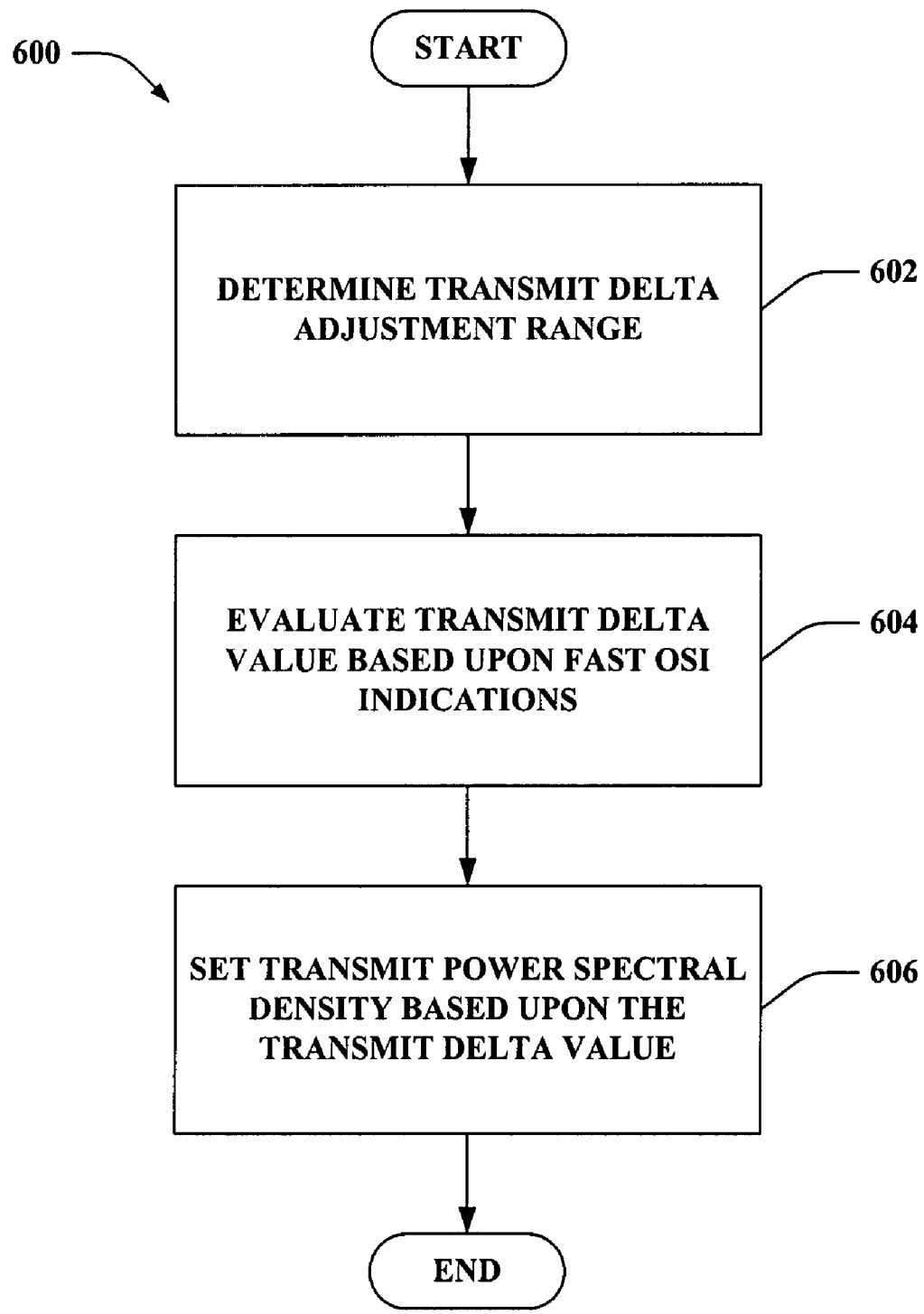
FIG. 6 is an illustration of an example methodology that facilitates adjusting transmit power based upon broadcasted interference information.

Referring to FIGS. 4-6, methodologies relating to reverse link power adjustment based upon broadcasted interference information. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning now to FIG. 4, illustrated is a methodology 400 that facilitates reveres link transmit power control. In accordance with an aspect of the subject disclosure, methodology 400 may be carried out by a base station. Method 400 can be employed to provide mobile devices with parameters relevant in power control decisions, among other things. At reference numeral 402, power control parameters are included in an assignment. An assignment, for example, may be an allocation of frequency resources or a designation of a reverse link data channel to a particular mobile device. The power control parameters may include a minimum and maximum carrier-over-thermal value for the reverse link data channel. In addition, the power control parameters may include an assigned or target C/I value relevant to a particular subband to which a mobile device is to be assigned. The power control parameters may not be included in every assignment as semi-static parameters may only be assigned when the parameters require updating. At reference 404, mobile devices are assigned. The assignment decisions may be based in part on feedback information received from mobile devices. The feedback information may include delta values (e.g., slow delta values and transmit delta values), power amplifier headroom, a buffer size, a QoS level, maximum allowed power based upon projected interference and/or a report of excessive fast OSI activity.

At reference numeral 406, a regular OSI indication is broadcasted. The broadcast may occur once every superframe and the indication may be included in the superframe preamble. The regular OSI indication is an average interference observed during the previous superframe(s). This value facilitates determining a slow delta value. At reference numeral 408, a fast OSI indication is broadcasted. The broadcast may occur for every subband on every reverse link frame. The fast OSI indication represents interference observed over a certain subband on a particular reverse link frame. The fast OSI indication facilitates determining a transmit delta value. At reference numeral 410, an interference offset value is broadcasted. An interference offset value is broadcasted for every subband. The value represents amount of interference observed on a particular subband filtered across interlaces. For example, the interference offset value may represent an IoT level of a subband.

Turning to FIG. 5, illustrated is a methodology 500 that effectuates reverse link power control in wireless communications. Method 500 can be employed by a mobile device to, among other things, generate a slow delta value utilized by a base station for future assignment decisions. At reference numeral 502, a range for a slow delta value is determined. The range may be based upon parameters included in an assignment. For example, a range may be computed based upon considerations of the minimum and maximum CoT values included in the assignment as well as a PSD of a pilot channel. The range defines minimum and maximum values for a slow delta value such that adjustments to the slow delta value are constrained within the range. These values may also be included in a previous assignment and not the most current. For example, certain parameters may be semi-static and only require periodic updating. At reference numeral 504, a slow delta value is evaluated or adjusted. The value is evaluated based upon regular OSI broadcasts from members of a monitor set. In addition, chandiff values corresponding to the monitor set members as well as a current slow delta value may be considered. At reference numeral 506, the adjusted slow delta value is transmitted. The value may be communicated to a base station serving a reverse link of a mobile device to be employed in future assignment decisions.

With reference to FIG. 6, illustrated is a methodology 600 that effectuates reverse link power adjustment. Method 600 may be employed by a mobile device in a wireless communications system to set a PSD for a reverse link traffic channel. At reference numeral 602, a range for a transmit delta value is established. The range may be based upon values included in an assignment. In addition, the range may be determined based upon considerations of interference offset values as well as a CoT value of a pilot channel. At reference numeral 604, a transmit delta value is evaluated or adjusted. The adjustment may be based upon fast OSI indications broadcasted. For example, the transmit delta value may be initialized to a maximum value and then adjusted up or down by an assigned step size depending on the fast OSI indications. An indication of increased interference in other sectors typically results in a step down of the transmit delta value while no indications may result in a step up of transmit delta value. At reference numeral 606, a power spectral density of a reverse link traffic channel is set. The PSD is established based upon the transmit delta value. For example, in accordance with an aspect of the subject disclosure, the traffic channel PSD is set to the sum of a PSD of a pilot channel and the transmit delta value. In addition, assigned boost values may be included in the sum.

It will be appreciated that, in accordance with one or more aspects described herein, inferences can be made regarding assigning mobile devices, generating OSI monitor sets, determining chandiff values, evaluating slow delta values, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to assigning mobile devices based upon considerations of slow delta values transmitted to a base station by the mobile devices. By way of further illustration, an inference may be made related to determining adjustments to a slow delta value based upon regular OSI indications, chandiff values and a current delta value. It will be appreciated that the foregoing examples are illustrative in nature and are not intended to limit the number of inferences that can be made or the manner in which such inferences are made in conjunction with the various embodiments and/or methods described herein.

Figure 7:
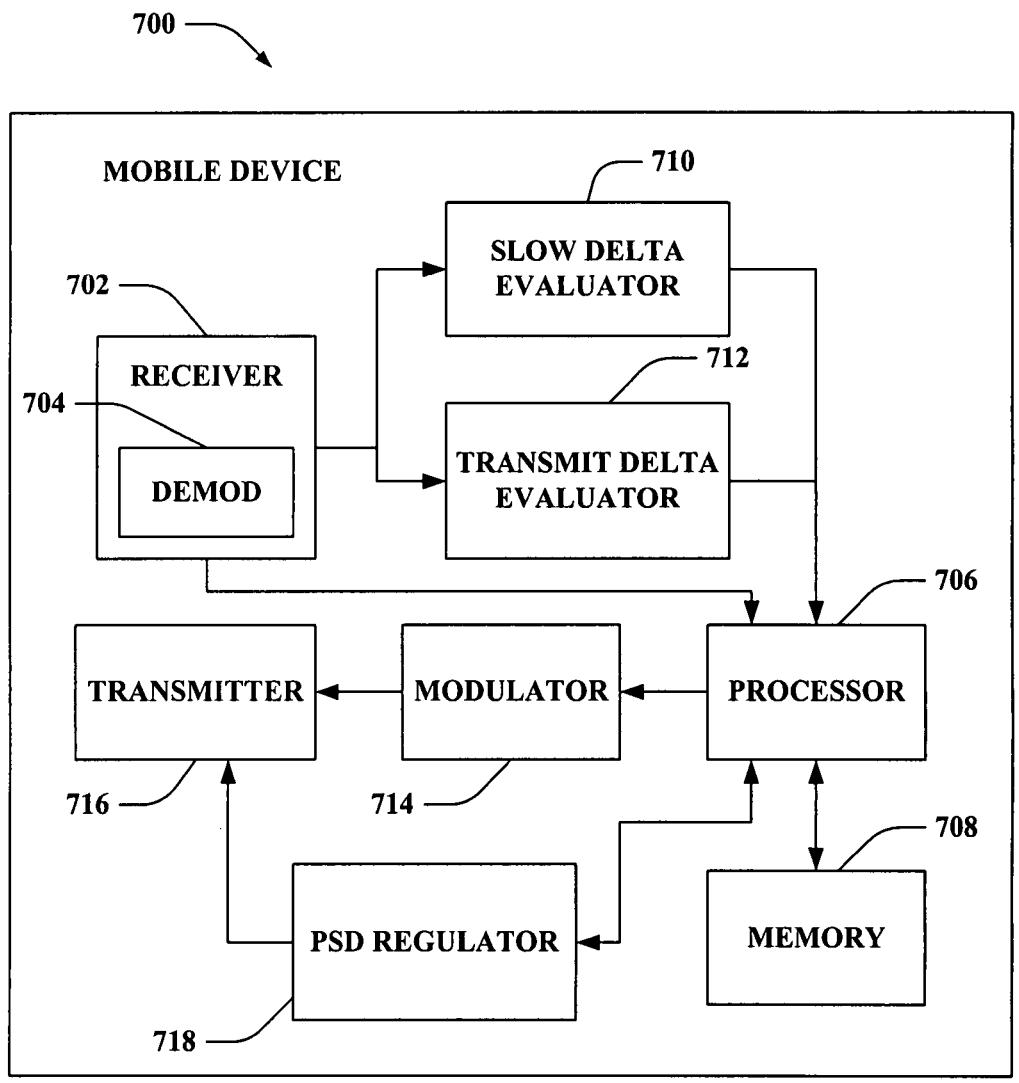
FIG. 7 is an illustration of an example mobile device that facilitates reverse link transmit power control.

FIG. 7 is an illustration of a mobile device 700 that facilitates adjusting reverse link power based upon considerations of broadcasted interference information. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that may store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a slow delta evaluator 710 that determines a slow delta value for mobile device 700. Slow delta evaluator 710 maintains and adjusts the slow delta value based upon considerations of regular OSI indications that are broadcasted by base stations and received at mobile device 700 by receiver 702. Slow evaluator 710 establishes an OSI monitor set by applying a threshold value to forward link geometries of sector that mobile device 700 can acquire other than a reverse link serving sector. Chandiff values are computed for each member of the set. The slow delta value is adjusted based upon the OSI monitor set, chandiff values and/or regular OSI indications. Additionally, the slow delta value may be transmitted by mobile device 700 to provide a suggested value for future assignments by a reverse link serving base station. Additionally, receiver 702 is coupled to a transmit delta evaluator 712 that determines a transmit delta value for mobile device 700. Transmit delta evaluator 712 maintains and adjusts the transmit delta value based upon considerations of fast OSI indications broadcasted by base stations and received at mobile device 700 by receiver 702. Transmit delta evaluator 712, after initializing the transmit delta value to a maximum, steps up or steps down the transmit delta value based upon the fast OSI indications. Mobile device 700 may transmit the adjusted value to a serving base station as feedback.

Mobile device 700 still further comprises a modulator 714 and transmitter 716 that transmits a signal (e.g. power limitation indicators) to, for instance, a base station, another mobile device, etc. A PSD regulator 718 is coupled to processor 706 and transmitter 716. PSD regulator established the power spectral density of a reverse link traffic channel assigned to mobile device 700 based in part on the transmit delta value maintained and adjusted by transmit delta evaluator 712 and a PSD of a pilot channel. Although depicted as being separate from the processor 706, it is to be appreciated that slow delta evaluator 710, transmit delta evaluator 712, PSD regulator 718 and/or modulator 714 may be part of processor 706 or a number of processors (not shown).

Figure 8:
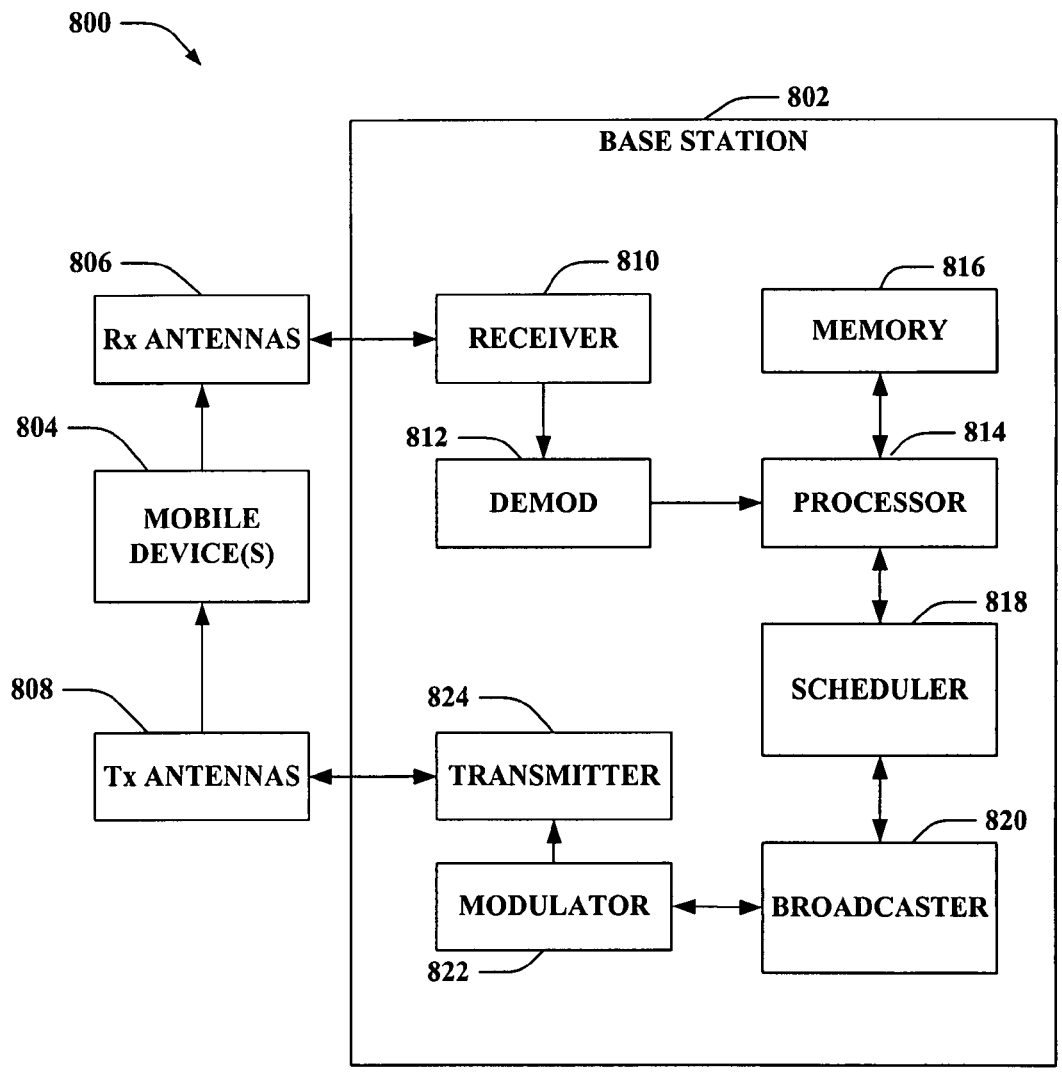
FIG. 8 is an illustration of an example system that facilitates reverse link power control by providing power control related information.

FIG. 8 is an illustration of a system 800 that facilitates reverse link power control through providing power control related information to mobile devices in a wireless communications system. System 800 comprises a base station 802 (e.g., access point, . . . ) with a receiver 810 that receives signal(s) from one or more mobile devices 904 through a plurality of receive antennas 806, and a transmitter 820 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to a scheduler 818 that assigns mobile device 804 to reverse link traffic channels. Scheduler 818 makes an assignment decision based up considerations of buffer size, QoS level and feedback information. Feedback information may include delta values (e.g., transmit delta value and slow delta value) received from mobile devices 804. In addition, feedback information may include power amplifier headroom and indications of excessive fast OSI activity. Scheduler 818 includes power control related information in the assignment. For example, scheduler 818 may include target C/I values, minimum and maximum CoT values, step sizes, etc. While these aforementioned parameters are assigned by base station 80, it is to be appreciated that the parameters need not be assigned through the same mechanisms or at the same time. For example, step sizes and minimum/maximum CoT values may be semi-static parameters that need not be assigned for each packet or assignment. These parameters may be updated through upper layer messages or the like whenever an update is needed. These values may be utilized by mobile devices 804 in power control decisions.

Processor 814 is further coupled to a broadcaster 820. Broadcaster 820 broadcasts information to mobile devices 804. The information is relevant to power control decisions to be made by mobile devices 804. For example, broadcasted information may include regular OSI indications broadcasted every superframe wherein the regular OSI indications represent average interference observed during the previous one or more superframes. Broadcaster 820 may further broadcast fast OSI indications corresponding to every subband. These indications represent interference observed over the subbands. In addition, broadcaster 820 may broadcast interference offset values that are based upon amount of interference observed on each subband filtered across interlaces. Modulator 822 can multiplex the control information for transmission by a transmitter 824 through antenna 808 to mobile device(s) 804. Mobile devices 804 can be similar to mobile device 700 described with reference to FIG. 7 and employ broadcasted information to adjust transmit power. It should be appreciated that other functions can be utilized in accordance with the subject disclosure. Although depicted as being separate from the processor 814, it is to be appreciated that scheduler 818, broadcaster 820 and/or modulator 822 may be part of processor 814 or a number of processors (not shown).

Figure 9:
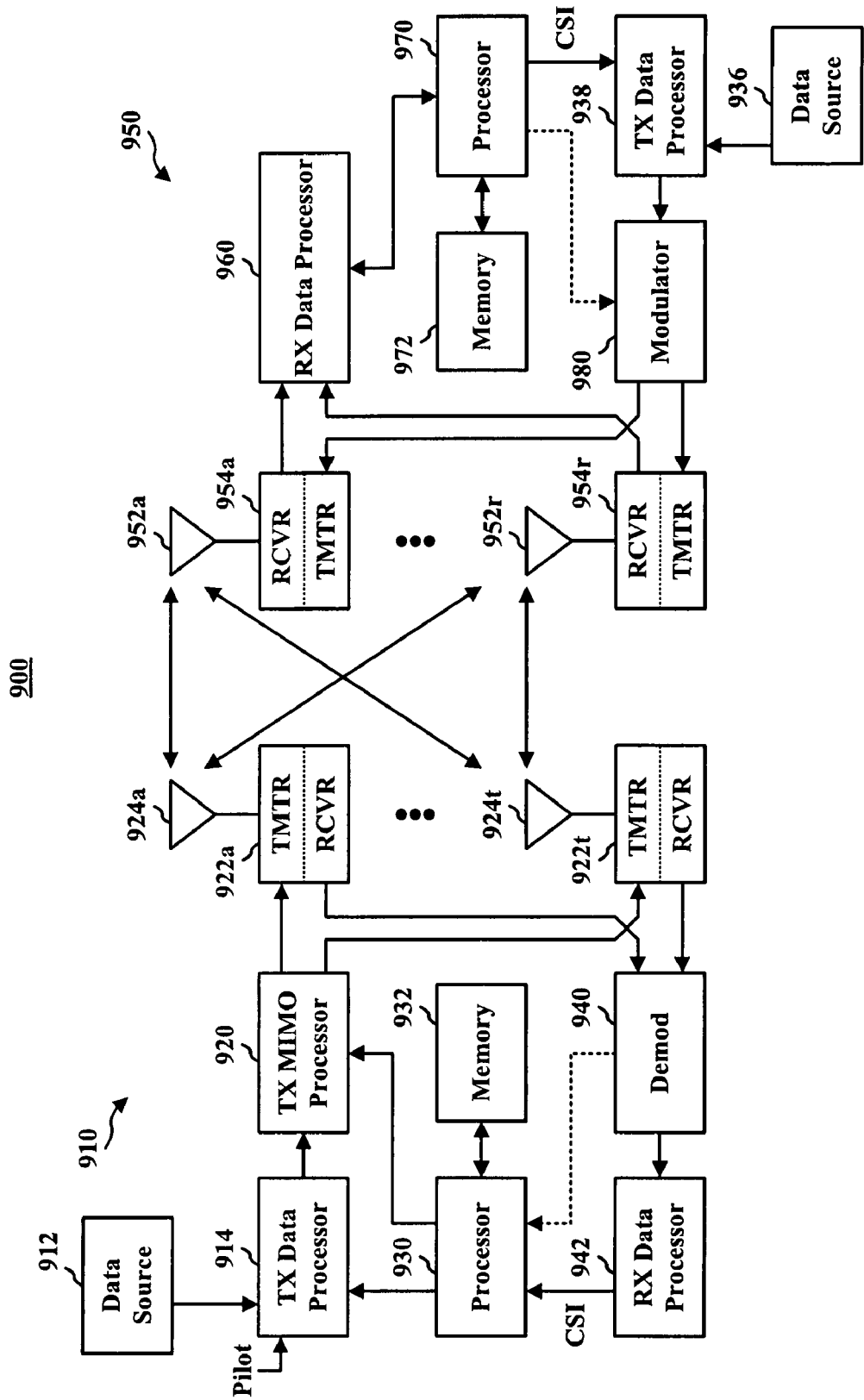
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 may include more than one base station and/or more than one mobile device, wherein additional base stations and/or mobile devices may be substantially similar or different from example base station 910 and mobile device 950 described below. In addition, it is to be appreciated that base station 910 and/or mobile device 950 may employ the systems (FIGS. 1-3, and 7-8) and/or methods (FIGS. 4-6) described herein to facilitate wireless communication there between.

At base station 910, traffic data for a number of data streams is provided from a data source 912 to a transmit (TX) data processor 914. According to an example, each data stream may be transmitted over a respective antenna. TX data processor 914 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 950 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 930.

The modulation symbols for the data streams may be provided to a TX MIMO processor 920, which may further process the modulation symbols (e.g., for OFDM). TX MIMO processor 920 then provides $N_T$ modulation symbol streams to $N_T$ transceivers (TMTR/RCVR) 922a through 922t. In various embodiments, TX MIMO processor 920 applies beamforming weights to the symbols of the data streams and to the antenna from which the symbol is being transmitted.

Each transceiver 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transceiver 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective transceiver (TMTR/RCVR) 954a through 954r. Each transceiver 954 conditions (e.g., filters, amplifies, and downconverts) a respective signal, digitizes the conditioned signal to provide samples, and further processes the samples to provide a corresponding "received" symbol stream.

An RX data processor 960 may receive and process the $N_R$ received symbol streams from $N_R$ transceivers 954 based on a particular receiver processing technique to provide $N_T$ "detected" symbol streams. RX data processor 960 may demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 may periodically determine which preceding matrix to utilize as discussed above. Further, processor 970 may formulate a reverse link message comprising a matrix index portion and a rank value portion.

The reverse link message may comprise various types of information regarding the communication link and/or the received data stream. The reverse link message may be processed by a TX data processor 938, which also receives traffic data for a number of data streams from a data source 936, modulated by a modulator 980, conditioned by transceivers 954a through 954r, and transmitted back to base station 910.

At base station 910, the modulated signals from mobile device 950 are received by antennas 924, conditioned by transceivers 922, demodulated by a demodulator 940, and processed by a RX data processor 942 to extract the reverse link message transmitted by mobile device 950. Further, processor 930 may process the extracted message to determine which preceding matrix to use for determining the beamforming weights.

Processors 930 and 970 may direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
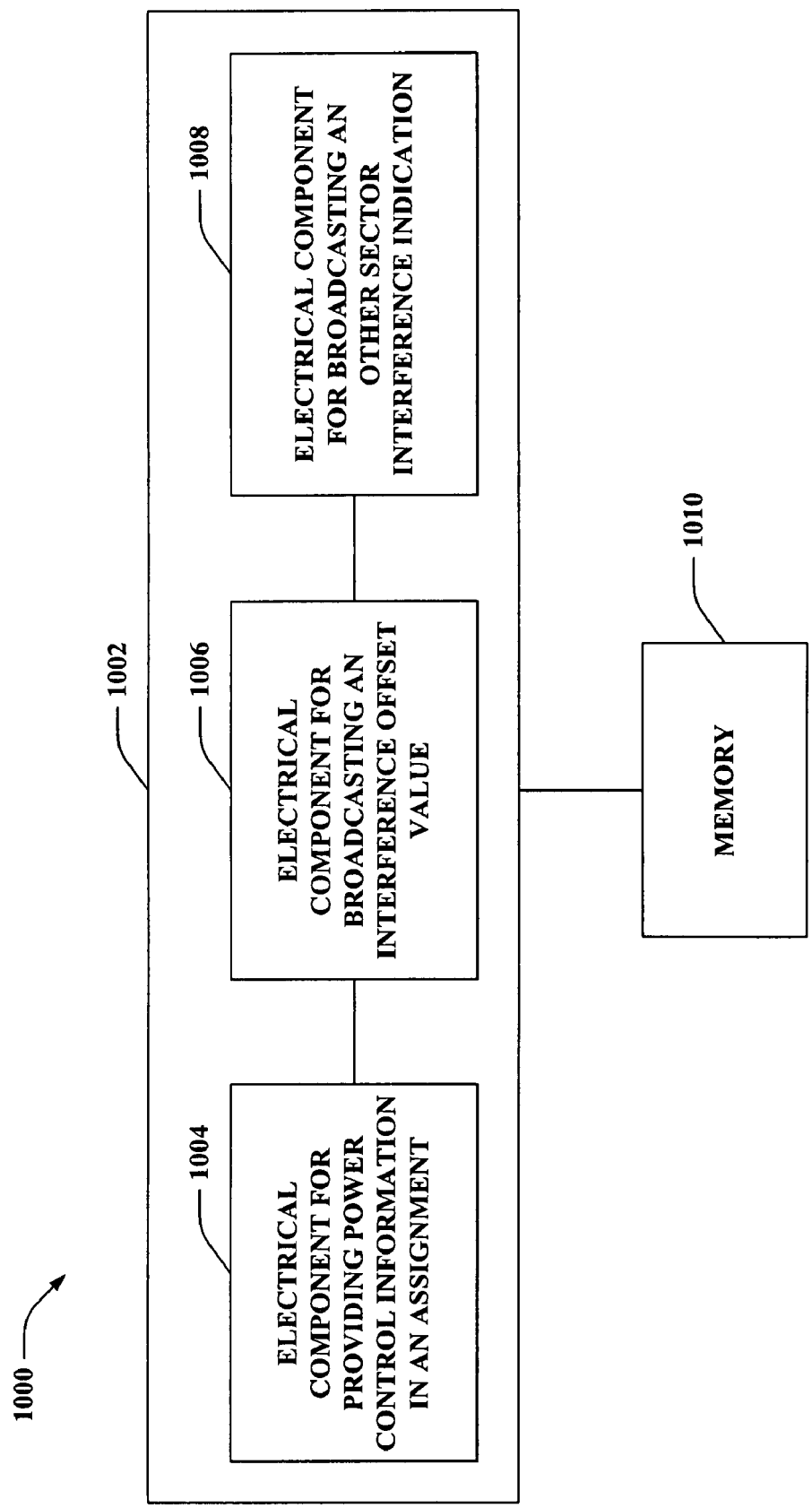
FIG. 10 is an illustration of an example system that facilitates power control through interference information broadcasts.

With reference to FIG. 10, illustrated is a system 1000 that facilitates generates an interference indication to be broadcasted to a plurality of mobile devices. For example, system 1000 may reside at least partially within a base station. It is to be appreciated that system 1000 is represented as including functional blocks, which may be functional blocks that represent functions implemented by a processor, software, or combination thereof (e.g., firmware). System 1000 includes a logical grouping 1002 of electrical components that can act in conjunction. For instance, logical grouping 1002 may include an electrical component for providing power control information in an assignment 1004. For example, minimum and maximum CoT values can be included in the assignment to enable setting a range for delta-based power control. While these aforementioned parameters are assigned by base station 80, it is to be appreciated that the parameters need not be assigned through the same mechanisms or at the same time. For example, step sizes and minimum/maximum CoT values may be semi-static parameters that need not be assigned for each packet or assignment. These parameters may be updated through upper layer messages or the like whenever an update is needed. Further, logical grouping 1002 may comprise an electrical component for broadcasting an interference offset value 1006. For example, interference offset values can be broadcasted for every subband and represent the IoT level observed for a subband. Moreover, logical grouping 1002 may include an electrical component for broadcasting other sector interference indications 1008. According to an example, other sector interference indications can include regular OSI indications that enable slow delta value evaluations. Slow delta values may be employed as suggested values for mobile device assignments. In addition, OSI indications may include fast OSI indications that provide indications of interference for transmission on a subband. Fast OSI indication enable adjusting transmit delta values. Additionally, system 1000 may include a memory 1010 that retains instructions for executing functions associated with electrical components 1004, 1006, and 1008. While shown as being external to memory 1010, it is to be understood that one or more of electrical components 1004, 1006, and 1008 may exist within memory 1010.

Figure 11:
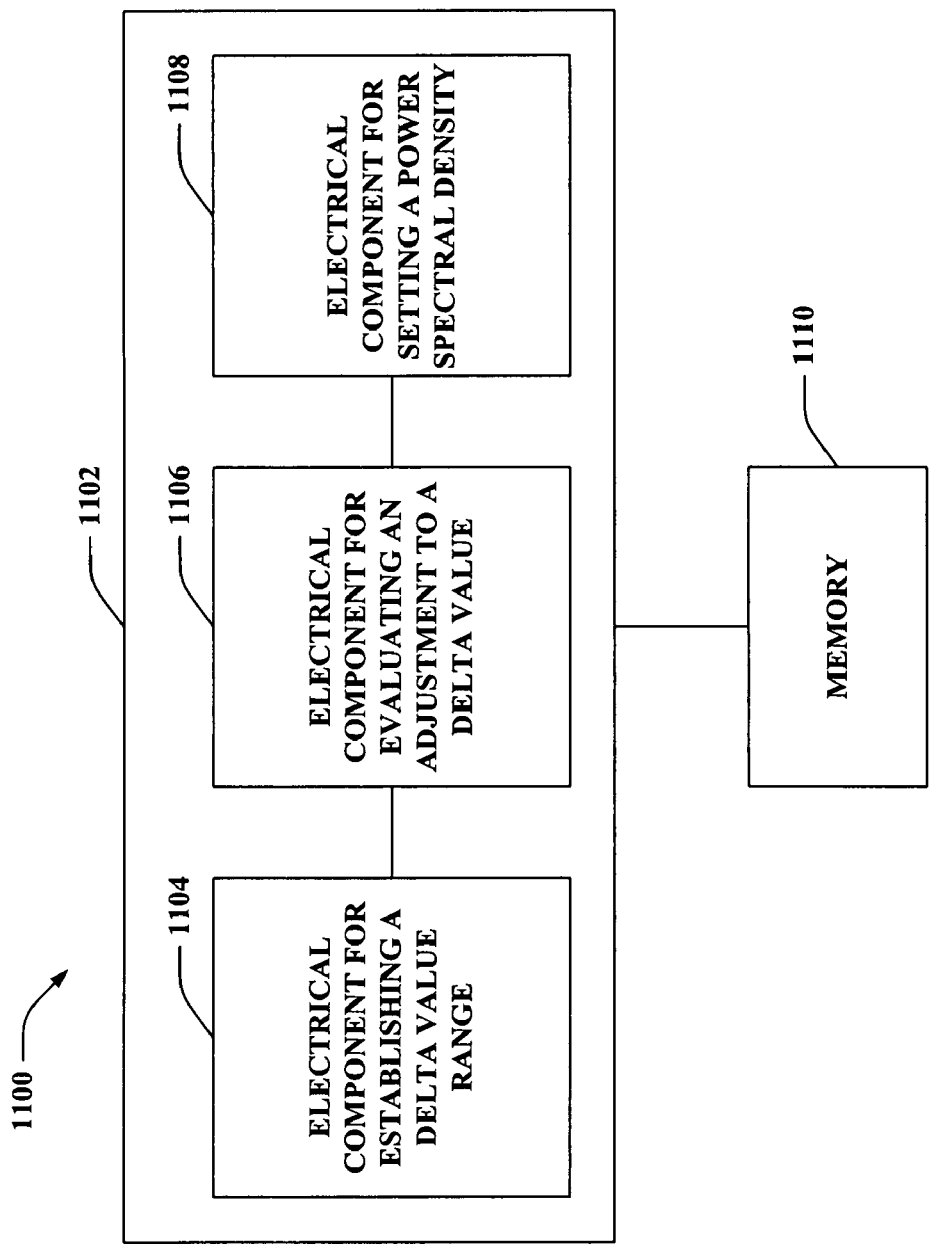
FIG. 11 is an illustration of an example system that facilitates reverse link transmit power control.

Turning to FIG. 11, illustrated is a system 1100 that adjusts power on a reverse link. System 1100 may reside within a mobile device, for instance. As depicted, system 1100 includes functional blocks that may represent functions implemented by a processor, software, or combination thereof (e.g., firmware). System 1100 includes a logical grouping 1102 of electrical components that facilitate controlling forward link transmission. Logical grouping 1102 may include an electrical component for establishing a delta value range 1104. For example, a slow delta value range or transmit delta value range can be set based upon considerations of power control information in an assignment and/or interference offset values broadcasted by a serving base station. Moreover, logical grouping 1102 may include an electrical component for evaluating an adjustment to a delta value 1106. For example, slow delta values can be adjusted based upon considerations of broadcasted regular OSI indications. In addition, transmit delta value can be adjusted based in part on fast OSI indications. Further, logical grouping 1102 may comprise an electrical component for setting a power spectral density 1108. For example, after evaluating an adjustment to a transmit delta value, the PSD of the reverse link traffic channel can be set based upon the new delta value, among other things. Additionally, system 1100 may include a memory 1110 that retains instructions for executing functions associated with electrical components 1104, 1106, and 1108. While shown as being external to memory 1110, it is to be understood that electrical components 1104, 1106, and 1108 may exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates reverse link traffic channel power control, comprising:
providing, by an apparatus, power control information in an assignment, wherein the power control information includes a minimum carrier-over-thermal (CoT) value and a maximum CoT value;
broadcasting, by the apparatus, an interference offset value for each subband utilized to establish an adjustment range; and
broadcasting, by the apparatus, an other sector interference (OSI) indication that is employed to adjust a power control value.

2. The method of claim 1, further comprising assigning a mobile device on a reverse link traffic channel with the assignment that includes power control information.

3. The method of claim 1, wherein the power control information includes at least one of a target carrier-to-interference (C/I) value or a power adjustment step size.

4. The method of claim 1, wherein the OSI indication is a regular OSI indication utilized for slow delta value adjustments.

5. The method of claim 4, wherein broadcasting the indication comprises broadcasting the regular OSI indication every superframe.

6. The method of claim 1, wherein the OSI indication is a fast OSI indication employed to adjust transmit delta values.

7. The method of claim 6, wherein broadcasting the indication comprises broadcasting the fast OSI indication for each subband on every reverse link frame.

8. The method of claim 1, wherein the interference offset is an indication of an interference-over-thermal (IoT) level per subband.

9. A wireless communications apparatus, comprising:
a memory that retains instructions related to providing power control information in an assignment, wherein the power control information includes a minimum carrier-over-thermal (CoT) value and a maximum CoT value, broadcasting interference offset values for each subband, broadcasting regular other sector interference (OSI) parameters and broadcasting fast OSI parameters; and
a processor coupled to the memory, configured to execute the instructions retained in the memory.

10. The wireless communications apparatus of claim 9, wherein broadcasting regular OSI parameters comprises including the parameters in every superframe preamble.

11. The wireless communications apparatus of claim 9, wherein broadcasting the fast OSI parameters comprises broadcasting the parameters for each subband.

12. A wireless communications apparatus that facilitates delta-based power control, comprising:
means for providing power control information in an assignment of a mobile device, wherein the power control information includes a minimum carrier-over-thermal (CoT) value and a maximum CoT value;
means for broadcasting an interference offset value for each subband; and
means for broadcasting an other sector interference (OSI) indication that enables delta-based power control.

13. The wireless communications apparatus of claim 12, further comprising means for assigning a mobile device on a reverse link traffic channel with the assignment that includes power control information.

14. The wireless communications apparatus of claim 12, wherein the power control information includes at least one of a target carrier-to-interference (C/I) value or a power adjustment step size.

15. The wireless communications apparatus of claim 12, wherein the OSI indication is a regular OSI indication utilized for slow delta value adjustments.

16. The wireless communications apparatus of claim 15, wherein broadcasting the indication comprises broadcasting the regular OSI indication every superframe.

17. The wireless communications apparatus of claim 12, wherein the OSI indication is a fast OSI indication employed to adjust transmit delta values.

18. The wireless communications apparatus of claim 17, wherein broadcasting the indication comprises broadcasting the fast OSI indication for each subband.

19. The wireless communications apparatus of claim 12, wherein the interference offset is an indication of an interference-over-thermal (IoT) level per subband.

20. A machine-readable medium having stored thereon machine-executable instructions for:
providing power control information in an assignment, wherein the power control information includes a minimum carrier-over-thermal (CoT) value and a maximum CoT value;
broadcasting an interference offset value for each subband utilized to establish an adjustment range; and
broadcasting an other sector interference (OSI) indication that is employed to adjust a power control value.

21. The machine-readable medium of claim 20, further comprising instructions for assigning a mobile device on a reverse link traffic channel with the assignment that includes power control information.

22. The machine-readable medium of claim 20, wherein the power control information includes at least one of a target carrier-to-interference (C/I) value or a power adjustment step size.

23. The machine-readable medium of claim 20, wherein the OSI indication is a regular OSI indication utilized for slow delta value adjustments.

24. The machine-readable medium of claim 23, wherein broadcasting the indication comprises broadcasting the regular OSI indication every superframe.

25. The machine-readable medium of claim 20, wherein the OSI indication is a fast OSI indication employed to adjust transmit delta values.

26. The machine-readable medium of claim 25, wherein broadcasting the indication comprises broadcasting the fast OSI indication for each subband on every reverse link frame.

27. The machine-readable medium of claim 20, wherein the interference offset is an indication of an interference-over-thermal (IoT) level per subband.

28. In a wireless communication system, an apparatus comprising:
an integrated circuit configured to:
assign a reverse link traffic channel to a mobile device;
provide power control related information in the assignment, wherein the power control related information includes a minimum carrier-over-thermal (CoT) value and a maximum CoT value; and
broadcast regular and fast other sector interference (OSI) indications to at least one mobile device to facilitate delta-based power control.

* * * * *